(12) United States Patent
Applegarth et al.

(10) Patent No.: US 12,343,671 B2
(45) Date of Patent: Jul. 1, 2025

(54) GAS-PROCESSING SYSTEMS AND METHODS

(71) Applicant: ENTEGRIS, INC., Billerica, MA (US)

(72) Inventors: Charles H. Applegarth, San Luis Obispo, CA (US); Gary Le, Westminster, CA (US); Luke D'Antonio, San Luis Obispo, CA (US); Matthew Schlotterbeck, Atascadero, CA (US)

(73) Assignee: ENTEGRIS, INC., Billerica, MA (US)

( * ) Notice: Subject to any disclaimer, the term of this patent is extended or adjusted under 35 U.S.C. 154(b) by 529 days.

(21) Appl. No.: 17/837,710

(22) Filed: Jun. 10, 2022

(65) Prior Publication Data
US 2022/0410061 A1 Dec. 29, 2022

Related U.S. Application Data

(60) Provisional application No. 63/214,184, filed on Jun. 23, 2021.

(51) Int. Cl.
*B01D 53/04* (2006.01)
*B01D 53/88* (2006.01)

(52) U.S. Cl.
CPC ....... *B01D 53/0438* (2013.01); *B01D 53/885* (2013.01); *B01D 2259/4009* (2013.01); *B01D 2259/45* (2013.01)

(58) Field of Classification Search
CPC ............ B01D 53/0438; B01D 53/0446; B01D 2259/4009; B01D 2259/45; B01D 53/885
See application file for complete search history.

(56) References Cited

U.S. PATENT DOCUMENTS

| | | | |
|---|---|---|---|
| 4,056,369 A * | 11/1977 | Quackenbush | B01D 53/04 96/111 |
| 6,783,749 B2 | 8/2004 | Narasimhan | |
| 7,189,280 B2 | 3/2007 | Alizadeh-Khiavi | |
| 7,381,242 B2 | 6/2008 | De Souza | |
| 8,062,410 B2 | 11/2011 | Bullinger et al. | |
| 9,771,522 B2 | 9/2017 | Matteucci et al. | |
| 2012/0263635 A1 | 10/2012 | Cork et al. | |
| 2014/0086797 A1 | 3/2014 | Petty | |
| 2016/0236137 A1 | 8/2016 | Amte et al. | |
| 2017/0246589 A1 | 8/2017 | Angelides | |
| 2020/0038799 A1 * | 2/2020 | Schmithuesen | B01D 53/261 |
| 2020/0368668 A1 * | 11/2020 | Applegarth | C01C 1/02 |
| 2020/0368669 A1 * | 11/2020 | Applegarth | C23C 16/4412 |
| 2020/0378681 A1 * | 12/2020 | Du | B01J 20/3458 |

FOREIGN PATENT DOCUMENTS

| | | |
|---|---|---|
| CN | 106563428 A | 4/2017 |
| JP | S56130747 U | 10/1981 |
| JP | S57159521 A | 10/1982 |
| JP | 2008126092 A | 6/2008 |
| TW | 201036692 A | 10/2010 |
| TW | 201622803 A | 7/2016 |
| TW | 202110525 A | 3/2021 |

OTHER PUBLICATIONS

Prior Art for Hybrid Preheater (1 page).

\* cited by examiner

*Primary Examiner* — Robert Clemente

(57) ABSTRACT

Described are gas-processing systems that include a pre-heater, that are useful for processing a flow of gas flowing the gas to contact media (e.g., purification media, catalyst, adsorbent), and related methods.

21 Claims, 4 Drawing Sheets

GAS-PROCESSING SYSTEMS AND METHODS

CROSS-REFERENCE TO RELATED APPLICATIONS

This application claims the benefit under 35 USC 119 of U.S. Provisional Patent Application No. 63/214,184, filed Jun. 23, 2021, the disclosure of which is hereby incorporated herein by reference in its entirety.

FIELD

The disclosure relates to gas-processing systems that include a pre-heater, that are used to process a gas by flowing the gas to contact media, and related methods.

BACKGROUND

Gases are used as raw materials or processing materials (together referred to as "raw material gases") for many different commercial and industrial purposes, including for manufacturing semiconductor and microelectronic devices.

To prepare the gas for use in a process, a flow of a gas may be handled or processed in a variety of different ways, to cause any of a variety of different effects on the gas. Prior to using a raw material gas in a manufacturing process, the gas may be heated, cooled, purified, or filtered.

Gas purification systems are adapted to supply a consistent flow of a highly purified raw material gas to a piece of manufacturing equipment, such as a semiconductor or microelectronic processing tool. Example gases include nitrogen, argon, helium, hydrogen, ammonia, carbon dioxide, clean dry air ("CDA"), and oxygen, each in a very highly purified form.

Techniques for purifying a flow of a gas can involve contacting the gas with a media material that can remove an amount of impurity from the gas. By some techniques, an impurity is removed from a flow of gas by sequestering the impurity, such as by causing the impurity to become adsorbed on a surface of an adsorbent (i.e., "adsorption media"). By other techniques, an impurity may by chemically converted using a catalyst to derivative compounds that are considered more desirable—or less undesirable—compared to the original impurity.

Manufacturers have designed highly specialized equipment for performing gas purification processes. Systems for purifying a gas will include a container (vessel) that holds a type of media (e.g., a purification media) such as an adsorbent or catalyst, and appurtenant flow control equipment that directs a flow of a raw material gas through the vessel to contact the media. Controls are included to control conditions of the process, such as temperature, pressure, and flow rates.

Many gas purification systems include a pre-heater that is used to pre-heat a gas before the gas is flowed through the vessel that contains the media. For example, to improve efficiency of a catalytic purification process, a gas may be pre-heated before contacting a catalyst. Equipment for these types of catalytic processes includes a vessel that contains the catalyst, flow controls to cause a flow of the gas through the catalyst, and a pre-heater that heats the gas to a high temperature before the gas flows to contact the catalyst.

A gas pre-heater may also be useful in adsorption-type gas purification systems. In these systems, purification by adsorption is performed by flowing a gas to contact adsorption media. Flowing the gas through the adsorption media causes impurity to become adsorbs onto the adsorption media. Over a period of use, the impurity accumulates on the adsorption media. After sufficient accumulation, the adsorption media becomes less effective, and may be "regenerated" by removing the accumulated impurity from the media.

A regeneration process may be performed with the adsorption media remaining in the same vessel as contained the media during the purification step, by passing heated gas ("regeneration gas") through the adsorption media in the original vessel. The regeneration gas contacts surfaces of the adsorption media, and adsorbed impurities that have accumulated on the media surfaces will desorb from the surfaces to be carried away from the adsorption media by the regeneration gas.

For efficient regeneration of the adsorption media by the regeneration gas, the regeneration gas is normally pre-heated before contacting the adsorption media. Equipment required for the regeneration processes includes the vessel that contains the adsorption media, flow controls to cause a flow of the regeneration gas through the adsorption media during a regeneration step, and a pre-heater to heat the regeneration gas before the regeneration gas flows through the adsorption media.

Figure 2:
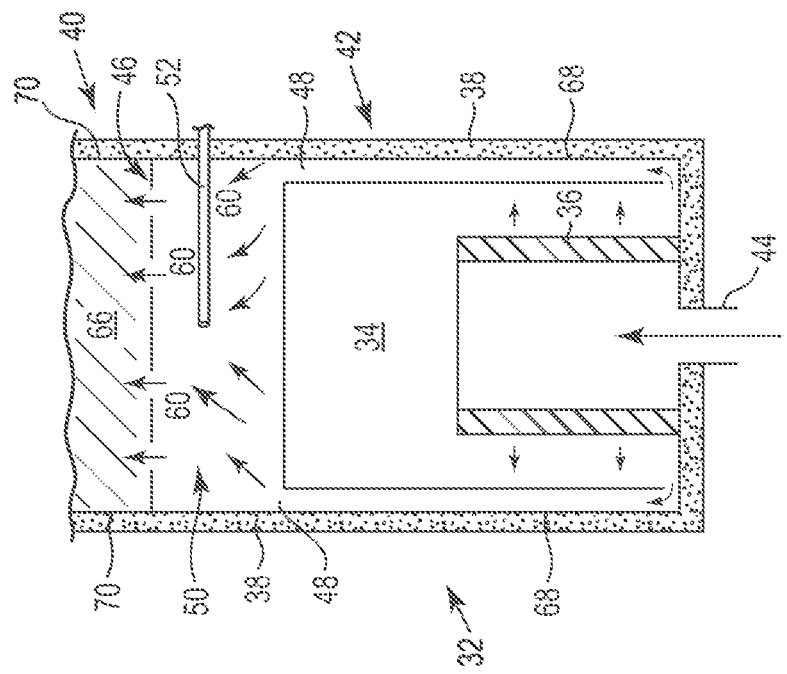
FIG. 2 illustrates a prior art arrangement of a pre-heater and a media vessel.

All figures are schematic, illustrative, and not necessarily to scale.

SUMMARY

Conventional pre-heaters for gas purification systems are separated from the vessel that contains the media (the "media vessel"). Some pre-heater designs (as "stand-alone" design) place a pre-heater at a spaced location from a media vessel and connect the pre-heater to the media vessel through an extended gasflow conduit. Other designs place the pre-heater near the media vessel, possibly as part of a common structure ("integrated" design), but these designs do not provide any size advantage, meaning that a pre-heater having an "integrated" design is the same size as for a "stand-alone" pre-heater. Additionally, a pre-heater of an "integrated" design does not allow for thermal energy to be shared between the pre-heater and the media vessel other than by the flow of heated gas from the pre-heater to the media vessel.

The following description relates to gas-processing equipment that includes a media vessel and a pre-heater of a novel and inventive design. The novel design allows the pre-heater to share heat energy with the media vessel through structures of the pre-heater and media vessel, e.g., through sidewalls of the structures, in addition to heat that is exchanged by pre-heated gas flowing from the pre-heater to the media vessel. Additionally, or alternatively, the novel design allows for a reduction in the size of a pre-heater, or a reduction in a total size of a combined pre-heater and media vessel.

The described gas-processing equipment generally includes a pre-heater for pre-heating a flow of gas before the gas flows to a subsequent processing operation, such as an operation that contacts the flow of gas with media to cause the gas to contact the media. The media may be a catalyst or adsorption media, for example.

A range of different types gas-processing operations involve contacting a gas with another material, which is referred to herein generically as a "media." The media may be any of various materials, with specific examples being solid materials (i.e., as opposed to liquid or gaseous materials) that can be of a range of forms (e.g., particles, granules, of solid (non-liquid, non-gaseous) pieces with a porous morphology, and of various sizes), and that may function as a catalyst, an adsorbent, or for another purpose when contacted with the gas.

When processing a gas by contacting the gas with media to cause the media to interact with the gas, the process may either require or may be improved by operating the process at an elevated temperature, by heating the gas, the media, or both. For example, processes of purifying a raw material gas by a catalytic technique are typically performed at an elevated temperature. Likewise, a process of regenerating adsorption media used for adsorption-type purification techniques is typically performed at an elevated temperature. For these methods, the relevant gas (the raw material gas or a regeneration gas) is pre-heated before the gas is contacted with the relevant media (catalyst or adsorption media).

During a process of contacting a gas with media to cause the media to interact with the gas, at elevated temperature, preferred conditions include uniform temperature distribution throughout the process, meaning throughout a media bed. Preferably, a vessel that contains the media with the gas flowing through the media will be controlled to a desired process temperature, and the entire vessel and all locations of the vessel, gas, and media, are kept at the same desired process temperature. Thermal gradients throughout the vessel are preferably minimized to produce high process efficiency.

In typical designs of gas purification systems, a gas pre-heater is an entirely separate structure relative to a vessel that contains media (e.g., purification media such as a catalyst or adsorbent). A separate (stand-alone) pre-heater is an independent piece of process equipment that requires separate flow control, separate temperature and pressure controls and sensors, separate heating and insulating equipment, and completely separate physical containment structures. The separate pre-heater must be built to control a flow of gas at the same pressure as that of the media vessel and must include a heating element and thermal insulation that are entirely separate from those of the media vessel.

According to a modified version of the stand-alone design, a gas pre-heater may be situated with an output of the pre-heater near an input end of a media vessel. The pre-heater is arranged physically "in line" with the media vessel. The gas enters the pre-heater and flows through the pre-heater at locations that are entirely upstream from and in-line with the media vessel. The pre-heater and the media vessel remain as substantially separate physical structures. The two physical structures do not share any substantial common structure, and the two separate structures do not allow for a substantial (useful) amount of thermal energy exchange, meaning other than by the flow of the pre-heated gas from the pre-heater into the media vessel.

The present patent application describes gas-processing apparatuses that include a pre-heater that is integrated into the physical structure of a media vessel in a manner that allows the pre-heater to share space with the media vessel, to share heat energy with the media vessel by conductive heat transfer, or both. The described design allows for a significant amount of heat energy to pass from the pre-heater to the media vessel, by thermal conduction through two-dimensional physical surfaces of the pre-heater and media vessel, particularly through two-dimensional sidewalls of the pre-heater and media vessel.

Examples of gas purification apparatuses as described include a media vessel having an inlet at one end, an outlet at an opposite end, and a length and a volume that extend between the two ends. According to example apparatuses, the pre-heater is located along at least a portion of the length of the media vessel. Also, for example, the pre-heater may contact the media vessel along the length of the media vessel, and the contact allows for heat energy to pass by thermal conduction between the pre-heater and the media vessel. Example apparatuses include a pre-heater that is located along a length of the media vessel that includes an end of the media vessel and a portion that extends from the end of the media vessel along the length of the media vessel toward the opposite end.

With example designs, a surface of the pre-heater along the length of the pre-heater contacts or is shared with a surface of the media vessel along the length of the media vessel. With the two surfaces being shared or in thermal contact, the combined structures may potentially be designed with an overall reduction of physical components. A reduced amount of physical components may allow for a cost savings, may allow for a reduction in a total size (especially length) of the two combined components, or both.

Example pre-heater designs include an interior volume that includes at least a portion that is annular in shape. An annular pre-heater volume can provide close contact between a gas that flows through the annular pre-heater volume and a heating element that contacts the outer surface of the pre-heater. Causing the gas that flows through the annular volume of the pre-heater to be in close contact with the heating element can improve the efficiency by which the heating element heats the gas, which may potentially allow for the use of a pre-heater that is of a reduced size, e.g., has a smaller interior volume or smaller overall space requirements compared to other pre-heater designs.

Examples of an annular interior volume of a pre-heater can include one or more interior surfaces that direct a flow of a gas through the annular volume. One example is a channel at an interior surface of the annular volume that guides a flow of gas along a spiral path that extends along the length of the annular volume. A spiral channel as part of an annular volume of a pre-heater can force a gas that flows through the pre-heater to flow around a circumference of the pre-heater and gradually (in a spiral path) along the length of the pre-heater. The annular path causes heat energy to be distributed evenly within the gas, through the pre-heater, meaning that the thermal energy is efficiently and evenly passed from a heating element that contacts the pre-heater to the flow of gas within the interior volume of the pre-heater. Efficient transfer of heat energy to the gas produces a flow of gas from the pre-heater that is highly uniform in temperature, with little or no temperature variation within the gas, and with a reduction or substantial elimination of thermal gradients within the gas as the gas exits the pre-heater.

In one aspect, the disclosure relates to a gas-processing apparatus that includes: a media vessel comprising a media vessel inlet end comprising a media vessel inlet, a media vessel outlet end comprising a media vessel outlet, a media vessel sidewall extending a length between the inlet end and the outlet end, and a media vessel interior extending between the inlet end and the outlet end; and a gas pre-heater located along a length of the media vessel sidewall.

In another aspect, the disclosure relates to a method of using a gas purification apparatus. The apparatus includes: a media vessel comprising a media vessel inlet end comprising a media vessel inlet, a media vessel outlet end comprising a media vessel outlet, a media vessel sidewall extending a length between the inlet end and the outlet end, a media vessel interior extending between the inlet end and the outlet end, and media contained in the interior; a gas pre-heater located along a length of the media vessel sidewall; and a heating element covering at least a portion of the pre-heater. The method includes: flowing a gas through the pre-heater to pre-heat the gas, and passing the pre-heated gas through the media vessel interior in contact with the media.

DETAILED DESCRIPTION

The following describes gas-processing equipment that is useful for processing a flow of gas, and that includes a pre-heater. Also described are methods of using the equipment for processing a gas by heating ("pre-heating") the gas before a subsequent processing operation performed on the flow of gas.

Equipment and techniques for processing a flow of a gas can involve contacting the flow of gas with media. For purifying a gas, the gas contains an impurity, and the media can reduce the amount of the impurity in the gas during contact between the media and the gas.

By some gas purification techniques, an impurity is removed from a flow of gas by sequestering the impurity, such as by causing the impurity to become adsorbed on a surface of an adsorbent material. The gas is flowed to contact the solid adsorbent material, and impurities that are present in the gas are attracted to and adsorbed onto surfaces of the adsorbent to remove the impurity from the gas. A variety of adsorbent materials are known. The adsorbent can be in any of various sizes and shapes, such as small particulates, granules, pellets, shells, cubes, monoliths, etc., with a desired amount of surface area per volume.

The composition of an adsorbent material of a gas purification process may also vary and may be selected based on a type of gas being processed, a type of impurity, a desired removal efficiency, or on other factors. Examples of adsorbents that are known to be useful to adsorb impurities from a flow of gas include: activated carbon, zeolite materials, a "metal organic framework" (MOF) adsorbent, getters such as zinc-vanadium and zinc-aluminum getters, and the like), among others.

The type of gas that contains impurities and that can be processed to remove the impurities using an adsorbent includes nitrogen, argon, helium, hydrogen, ammonia, carbon dioxide, clean dry air ("CDA"), and oxygen, among others.

During use of an adsorbent-type gas purification system, an amount of the impurity will accumulate on the adsorbent. The accumulated impurity may be removed from the adsorbent by a "regeneration" step, and the adsorbent may then be used again for purifying gas. In a regeneration step, a flow of gas (a "regeneration gas") is passed over the adsorbent, at an elevated temperature. The elevated temperature is produced by a pre-heater, as described herein.

A regeneration gas may be any gas that is effective in a regeneration step to remove accumulated impurities from adsorption media. The composition of a regeneration gas for removing impurity from adsorption media depends on factors that include the type of raw material gas that was processed using the adsorption media. For example systems, a regeneration gas that may be useful to remove accumulated impurities from an adsorption media that was used to remove impurities from a particular type of raw material gas (identified in parentheses), include the following regeneration gases: nitrogen/hydrogen mixture (nitrogen), argon/hydrogen mixture (argon), helium/hydrogen mixture (helium), hydrogen (hydrogen), nitrogen/hydrogen mixture (ammonia), nitrogen/hydrogen mixture (carbon dioxide), clean dry air (clean dry air), oxygen (oxygen).

By different gas purification techniques, a gas purification step may use a catalyst to reduce or remove an amount of impurity from a gas. By these techniques, an impurity contained in a gas may by chemically converted, e.g., chemically reduced or chemically oxidized, using a catalyst, into chemical compounds that are more desirable—or less undesirable—compared to an original impurity. Example catalysts are effective to chemically reduce nitrogen oxides ($NO_x$), to oxidize carbon monoxide, or to oxidize a hydrocarbon such as methane to form water and carbon dioxide. By these techniques, the gas is flowed to contact the catalyst material, and an impurity (e.g., a nitrogen oxide, carbon monoxide, or a hydrocarbon such as methane) is chemically converted (e.g., chemically reduced or chemically oxidized) into chemical compounds that are preferred relative to the original impurity.

The composition of a catalyst of a gas purification process may also vary and may be selected based on a type of gas being processed, a type of impurity contained in the gas that is being processed, a desired efficiency of removal of the impurity, as well as other factors. Examples of catalysts that are known to be useful to convert impurities that are contained in a flow of gas include: rhodium, platinum, palladium, among others.

A gas-processing apparatus that processes gas by flowing the gas through a bed of media includes a vessel (a "media vessel") that contains the media, and flow controls that are adapted to guide the flow of the gas through the media. The equipment also includes a pre-heater that is used to heat ("pre-heat") the gas before the gas enters the media vessel.

According to examples of the described gas-processing apparatus, a useful apparatus includes a media vessel that has an inlet end, an outlet end, a length that extends between the ends, and sidewalls that extend along the length and define an interior volume of the media vessel. The sidewalls can be made of a rigid, thermally conductive material such as a metal.

Also, according to example apparatuses, a portion of the pre-heater is located adjacent to an outside surface of the media vessel along at least a portion of the length of the media vessel. A useful or preferred pre-heater can include a two-dimensional surface that is in thermal contact with an outer two-dimensional surface of the media vessel.

A pre-heater that is "in thermal contact" with a media vessel refers to a pre-heater that has a two-dimensional surface (such as a sidewall) that is located in sufficiently close proximity to a two-dimensional surface (such as a sidewall) of the media vessel to allow a useful amount of thermal energy to pass from the surface of the pre-heater to the surface of the media vessel; a useful amount of thermal energy may be a more than negligible amount of thermal energy passing from the pre-heater to the media vessel during use of the pre-heater to supply pre-heated gas to the media vessel. An amount of thermal energy that may pass between the two surfaces will depend on the distance or amount of contact between the two surface structures, the compositions and thermal conductivities of the two surface structures, and the composition and form of any (solid, liquid, gas) material that is disposed between the two surfaces.

To provide for a useful amount thermal contact between a pre-heater and a media vessel, an example gas-processing apparatus may be constructed with a two-dimensional, thermally-conductive surface of a sidewall of the pre-heater being in direct contact with a two-dimensional, thermally-conductive surface of a sidewall of the media vessel. The sidewall structure of the pre-heater is identifiable as a separate physical structure that is not a required component of the media vessel, and the two different sidewall structures are in direct physical contact with each other to allow for efficient transfer of thermal energy, by thermal conduction, from the surface of the pre-heater sidewall to the surface of the media vessel sidewall.

Alternatively, separate sidewalls of each of the media vessel and the pre-heater, which are separately identifiable and associated with only one of the media vessel or the pre-heater, may be separated by a small distance or space and still be considered to be in thermal contact. The space between the two sidewalls may be empty (i.e., filled with air) or filled with a heat-conductive material. The two sidewall structures may have opposed surfaces that face each other from a distance is sufficiently small to allow for desired transfer of heat between the structures. Example distances may be relatively small, e.g., less than 10 millimeters, or less than 5, 2, or 1 millimeter. A gas or solid material (e.g., air or a thermally conductive solid) present between the two sidewall surfaces can allow for efficient transfer of heat between the two sidewalls.

Alternatively, a gas-processing apparatus as described may be constructed in a manner by which a sidewall of a media vessel and a sidewall of a pre-heater are made from a single physical structure. The single sidewall structure functions to defines an interior of the media vessel on one side of the sidewall (the "inside" of the single sidewall), and also functions to define an interior of the pre-heater on an opposite side of the sidewall (the "outside" of the single sidewall).

In contrast, sidewall structures of a media vessel and a pre-heater are considered to be not in thermal contact with each other if the two structures are arranged in a way that does not allow a useful amount of thermal energy transfer from the pre-heater to the media vessel during a gas-processing step as described herein. Various designs of previous gas-processing systems place a pre-heater and a media vessel with the two being not in thermal contact.

Figure 1:
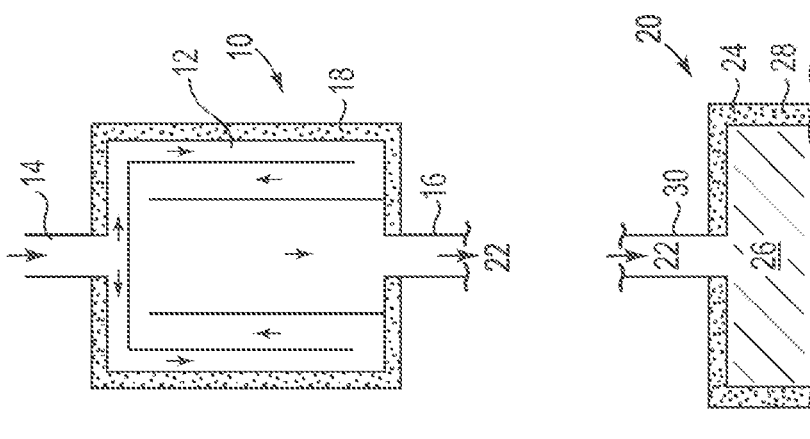
FIG. 1 illustrates a prior art arrangement of a pre-heater and a media vessel.

For example, referring to FIG. 1, a "stand alone" pre-heater 10 is a separate device and located a distance away from a media vessel 20. The two units are connected only by a gasflow conduit that passes a pre-heated gas from an outlet of pre-heater 10 to an inlet of media vessel 20. Pre-heater 10 includes an interior volume that is heated using heater 12 (not specifically shown), and that is insulated by insulating material 18, each of which is located generally at an outside perimeter surface of the pre-heater structure.

A gas enters inlet 14, passes through the interior volume of pre-heater 10, including through an annular volume at a perimeter, near heater 12. The interior volume of pre-heater 10 is held at an elevated temperature using heater 12, to cause a desired increase in the temperature of the gas. Pre-heated gas 22 flows out of outlet 16 and then is flowed through a conduit (not shown) that connects to input 30 of media vessel 20. Media vessel 20 includes an interior that contains media 26 and is heated and insulated by heater 24 (not specifically shown) and insulating material 28, each of which is located at a perimeter of media vessel 20 to surround media vessel 20. The exchange of heat energy from pre-heater 10 to media vessel 20 is limited to an exchange that occurs with the flow of pre-heated gas 22 from pre-heater 10 to media vessel 20. The physical structure of media vessel 20 is not in thermal contact with the physical structure of pre-heater 10.

Referring to FIG. 2, illustrated schematically is a gas-processing system 32 that includes media vessel 40 and pre-heater 42 located at an "upstream" location from inlet 46 of media vessel 40. "Upstream" refers to the system when flow is directed first through the pre-heater, then through media vessel 40. As shown, pre-heater 42 is a device that is located a distance from media vessel 40, in-line with media vessel 40, and with the pre-heater being separated from the media vessel by gap space 50. Pre-heater 42 is connected to inlet 46 of media vessel 44 through gap space 50 (which contains thermocouple 52), into which a pre-heated gas passes through outlet 48 of pre-heater 42. In this design of a pre-heater and media vessel system, pre-heater 42 is referred to as being "integrated" with the media vessel.

Pre-heater 42 includes interior volume 34 and filter 36, that are heated using a heater (not shown) that can be located at an outside surface of pre-heater 42, and that is insulated by insulating material 38, each of which is located generally at a perimeter of pre-heater 42. During use of pre-heater 42, a flow of gas enters inlet 44 and passes through interior volume 34 of pre-heater 42, including through an annular volume at a perimeter, near the heater. The heater heats interior volume 34 to an elevated temperature to cause the temperature of the gas that passes through volume 34 to increase. Pre-heated gas 60 flows out of outlet 48, through gap space 50, and then into media vessel 40 through inlet 46. Media vessel 40 includes an interior that contains media 66 and is heated and insulated by a heater (not shown) and insulating material 38, each of which surrounds the outside surface of media vessel 40.

An exchange of heat energy between media vessel 40 and pre-heater 42 occurs with the flow of pre-heated gas 60 from pre-heater 42 to media vessel 40. Media vessel 40 is not in thermal contact with pre-heater 42. Media vessel 40 and "integrated" pre-heater 42 are constructed with an outlet end of pre-heater 42 located in-line with inlet 46 of media vessel 40. No portion of pre-heater 42 extends along any portion of the length of media vessel 40, and two-dimensional surfaces of sidewalls (68) of the pre-heater are not in thermal contact with two-dimensional surfaces of sidewalls (70) of the media vessel.

As illustrated, sidewall 70 of media vessel 40, and sidewall 68 of pre-heater 42, may be constructed of a single piece of material that extends along the length of both of media vessel 40 and pre-heater 42. The use of this single piece of material as a sidewall structure of both the media vessel and the pre-heater does not result in thermal contact between the media vessel and the pre-heater, at least because the amount of thermal energy that can be passed along the material, through the thickness of the material and along the length of the material, is negligible.

In contrast to such previous designs, example pre-heaters of the present description include a physical structure that is in thermal contact with a media vessel, e.g., over a two-dimensional surface of the structure. The thermal contact between the media vessel and the pre-heater allows a useful and significant amount of heat energy to be passed by thermal conduction from the pre-heater to the media vessel.

To achieve this transfer of heat energy, a two-dimensional surface portion of the pre-heater is physically located adjacent to an outside two-dimensional surface of the media vessel, along the length of the media vessel, and can preferably be in direct physical contact with the outside surface of the media vessel. Preferably, the pre-heater sidewall and the media vessel sidewall are each made of materials that have good thermal conductivity, for example a metal.

According to example gas-processing apparatus designs, the pre-heater includes an interior volume that extends along a length of the media vessel. More specifically, the pre-heater includes a total internal volume through which a gas flows during use, that includes a portion that is annular (an "annular volume"). The annular volume extends along a portion of the pre-heater that is located along an outside surface of the media vessel over at least a portion of the length of the media vessel between the media vessel inlet and the media vessel outlet.

In example pre-heaters, a total volume of a pre-heater interior also includes a non-annular (e.g., cylindrical) portion that is located adjacent to and in-line with the outlet end of the media vessel. This portion of a total interior volume of s pre-heater is referred to herein as an "end volume" of the pre-heater. Example end volumes can have a cross-sectional shape and size (e.g., diameter) that are approximately equal to the cross-sectional shape and size of the media vessel and can have a length that extends in a direction parallel to the length of the media vessel.

Depending on the use of the pre-heater, the pre-heater can include one or more passages that allow a flow of gas to pass between an external location and the pre-heater interior volume, which may be either the end volume or the annular volume. These passages extend through an outer sidewall or endwall of the pre-heater, and may be referred to as "passages," "inlets," or "outlets." But, a passage may typically allow for flow of a gas in either of two directions, either into the pre-heater or out of the pre-heater, and a passage, regardless of whether the passage is referred to as an "inlet" or an "outlet," may function as either an inlet or an outlet during different process steps performed by the gas processing apparatus using the pre-heater.

In certain types of example pre-heaters, a pre-heater can include two passages. One passage may be located to allow for a flow of gas between an annular volume of the pre-heater and an external location. A different passage may be located to allow for a flow of gas between an end volume of the pre-heater and an external location.

In alternative examples, a pre-heater may include just one passage that is located to allow for a flow of gas between an annular portion of the pre-heater and an external location. This example does not require a second passage that passes directly between an end volume of the pre-heater and an external location.

In example apparatuses, placing the pre-heater at the outside of the media vessel, along a portion of the length of the media vessel, allows for useful or advantageous features of the apparatus. These may include one or more of: efficient performance of the pre-heater, e.g., in terms of gas flow volume and efficiency and uniformity of heating a gas; reduced requirements for supporting equipment such as multiple separate heating devices and insulating materials for a combination of a pre-heater and a media vessel; structural advantages based on a reduced size and space requirement of a design of the present description; or milder operating conditions of a gas flowing through the pre-heater such as a reduced pressure or flow rate of a regeneration gas that that must flow through the pre-heater.

Generally, a pre-heater as described may perform with improved efficiency when being used to pre-heat a gas that is delivered to a media vessel. The location of the pre-heater at an outer surface of the media vessel, along the length of the media vessel, and preferably in thermal contact with the media vessel, provides for a highly efficient method of heating the gas that flows through the pre-heater, while simultaneously heating at least a portion of the media vessel and media contained in at least a portion of the media vessel.

As one benefit, the location of the pre-heater along a length of the media vessel with the pre-heater and media vessel being located along a shared length of a gas-processing apparatus can allow for a reduced total size of the pre-heater or the apparatus. The total combined volume of a pre-heater and media vessel may be substantially reduced relative to a total combined volume of a comparable media vessel and a "stand-alone" pre-heater, or of a comparable media vessel and an "integrated" pre-heater.

Additionally, the location of the pre-heater at an outside surface of a media vessel, along a length of the media vessel, can allow for a reduced size and amount of total heating elements and thermal insulating material that are required to heat and insulate the pre-heater and the media vessel. Both "stand-alone" pre-heater designs and "integrated" pre-heater designs (see FIGS. 1 and 2) do not achieve any significant amount of heat transfer between a media vessel and a pre-heater, other than the flow of heated gas between the pre-heater and the media vessel. In contrast, a pre-heater as described causes thermal energy to flow from the pre-heater into the media vessel by thermal conduction through sidewalls of the pre-heater and media vessel. A heating element and an insulation material used to heat and insulate the pre-heater, located to thermally contact the media vessel, functions to heat and insulate both of the pre-heater and the media vessel (at least a portion of the media vessel) at the same time.

Still additionally, the location of the pre-heater at an outside surface of the media vessel, along a length of the media vessel, provides for a single structure of a compact (efficient) total size, including a reduced total length of the two combined pre-heater and media vessel structures compared to previous designs. The total combined length of a pre-heater and media vessel of the present description may be substantially reduced relative to a total combined length of a comparable media vessel and an "integrated" pre-heater having the same processing capacity, e.g., that includes a media vessel of the same size.

Figure 3:
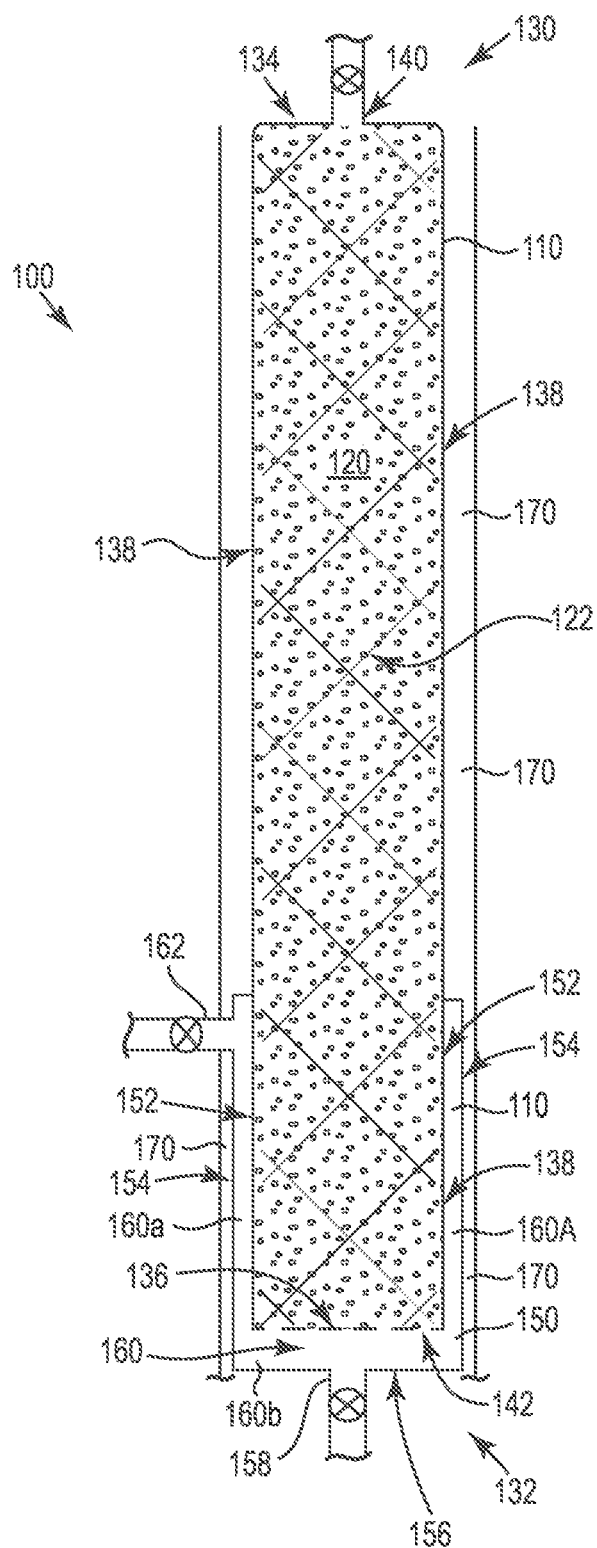
FIG. 3 illustrates a gas-processing system of the present description.
Figure 4:
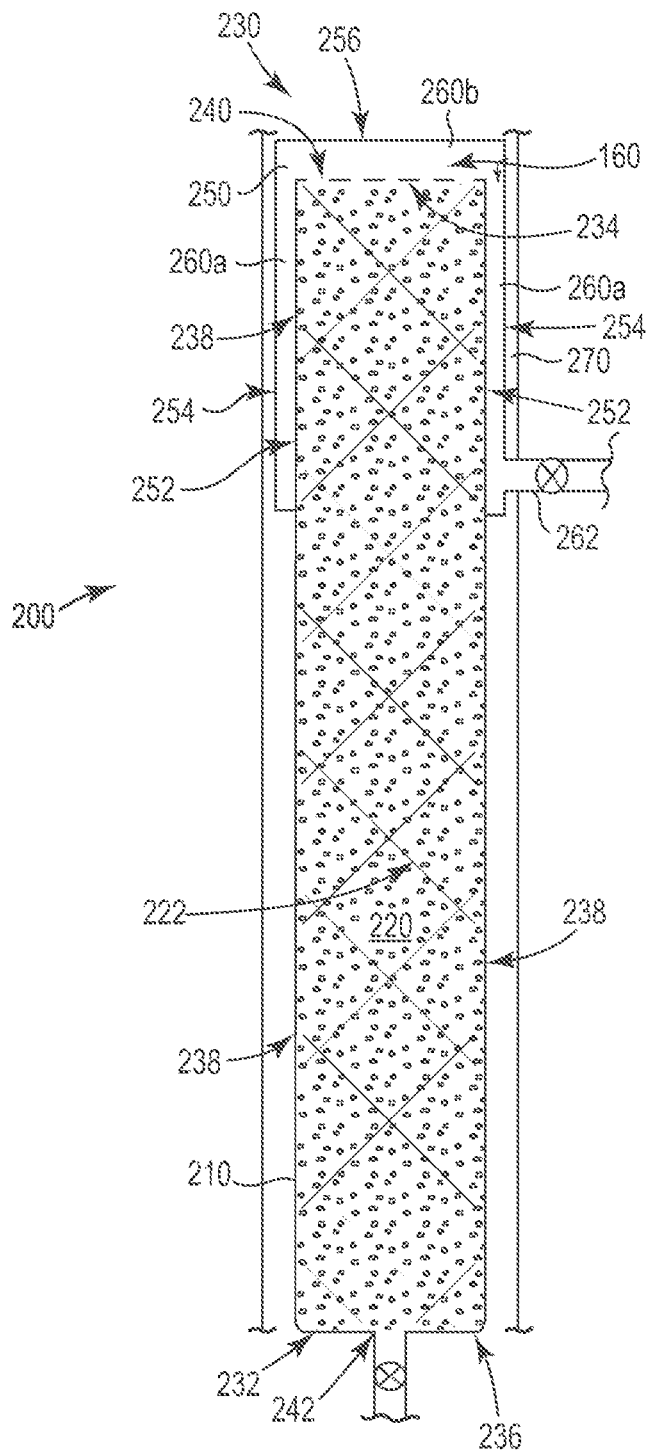
FIG. 4 illustrates a gas-processing system of the present description.

In some gas-processing apparatuses, a volume of a pre-heater relative to a media vessel may be smaller than a volume of a relative volume of a pre-heater to a media vessel of a different design, e.g. a "stand-alone" design or an "integrated" design shown at FIGS. 1 and 2). In example designs, volume of a pre-heater of a gas-processing system of the present description (e.g., as illustrated at FIG. 3 or 4) can be less than 50, 40, 30, 20, or 10 percent of a volume of the media vessel.

Similarly, depending on the application of a gas-processing apparatus, the flow rate (by volume) of a flow of gas that will pass through a pre-heater relative to a flow rate (by volume) of gas through a media vessel of the gas-processing apparatus may be reduced, of a lower pressure, or both, as compared to a flow of gas that would be required to pass through a pre-heater of a different design, such as a "stand-alone" pre-heater or an "integrated" pre-heater. For example, a pre-heater of the present description that is used to pre-heat a regeneration gas may perform effectively during a regeneration step with the use of a significantly smaller flow rate by volume of regeneration gas through the pre-heater, compared to a flow rate of gas that would be required for a pre-heater of a "stand-alone" design or a pre-heater of an "integrated" pre-heater used to pre-heat a regeneration gas.

One specific example of a gas-processing apparatus as described is a gas purification system that includes adsorbent contained in the media vessel. See FIG. 3. To provide a high level of purity of a raw material gas used in a commercial manufacturing process, the process can begin with a source of highly purified raw material gas ("raw material gas") that is typically contained in and delivered from a storage vessel. Before delivering the raw material gas from the storage vessel for use in the manufacturing process, the raw material gas is processed by an additional (final) purification step at a location of the manufacturing process. By common techniques, this step is performed by flowing the raw material gas from the storage vessel into and through a gas purification system that contains adsorption media in the form of particles, i.e., a "bed" of adsorption media particles. The gas flow is caused to pass through the bed of adsorption media particles to contact the gas with surfaces of the adsorption media. When the raw material gas contacts a surface of the adsorption media, impurities that are present at very low levels in the raw material gas are adsorbed by the adsorption media and removed from the raw material gas.

During a period of use of the gas purification system, the impurity that is removed from the raw material gas will adsorb onto and gradually accumulate on the adsorption media. After sufficient accumulation the adsorption media becomes loaded with the impurity and is less effective. The media may either be replaced or "regenerated." Regenerating the media refers to a process that removes an amount of the accumulated impurity from the media to allow the media to be used again for removing impurity from a raw material gas.

A regeneration process may be performed with the adsorption media remaining in the adsorption vessel that was used to contain the media during the purification step by passing heated gas ("regeneration gas") through the adsorption media in the vessel. The regeneration gas contacts surfaces of the adsorption media, and impurities that are adsorbed and accumulated on the media surface desorb from the surface and are carried away from the media in the flow of regeneration gas. By removing a sufficient amount of the adsorbed impurity from the adsorbent, the regenerated adsorbent can be made useful again for removing impurity from a raw material gas.

A regeneration gas may be heated, i.e., pre-heated, before being brought into contact with the adsorption media. A heated regeneration gas is capable of removing a greater amount of impurity from the adsorption media compared to a non-heated regeneration gas.

Referring to FIG. 3, illustrated is an example of a gas-processing apparatus as described herein, for use in purifying a gas by adsorbing impurities in the gas onto surfaces of a bed of adsorption media particles, and that is additionally capable of a step of regenerating the adsorption media by passing heated regeneration gas through the bed of adsorption media to remove impurities from the adsorption media.

Gas-processing apparatus 100 includes a media vessel and a pre-heater as part of a single gas-processing apparatus. The pre-heater is combined structurally with the media vessel in a manner that provides effective pre-heating of a regeneration gas that flows through the pre-heater.

Apparatus 100 includes media vessel 110, which defines media vessel interior 120 (cylindrical, as illustrated), which contains media 122 in the form of a bed of media particles (as illustrated). Media 122 can be particles of adsorbent material, and gas-processing apparatus 100 can be used as a gas purification apparatus to remove impurities from a raw material gas by causing the impurities to become adsorbed onto media 122 as the raw material gas is caused to flow through the bed of media 122.

Media vessel 110 includes inlet 140, outlet 142, and interior volume 120 between the inlet and the outlet. More specifically, media vessel 110 includes inlet end 130 (at an upper or "top" location, as illustrated), which includes endwall 134, which contains media vessel inlet (opening) 140. Media vessel 110 also includes outlet end 132 (at a lower or "bottom" location), which includes endwall 136, with media vessel outlet (one or more passages) 142. Media vessel interior 120 is defined by inlet endwall 134, outlet endwall 136, and sidewalls (illustrated as cylindrical) 138. Media vessel outlet 142 can be a supportive structure such as a screen or apertured plate or disc that includes multiple openings that are sized to be smaller than the size of the particles of media 122. Media vessel outlet 142 can thereby support particles of media 122 while allowing a flow of gas to pass between the interior of vessel 110 and the interior of pre-heater 150.

Pre-heater 150 is located at the outlet end in contact with a bottom portion of media vessel 110, and along at least a portion of the length of an outside of media vessel 110. The length of media vessel 110 is the distance between inlet endwall 134 and outlet endwall 136.

Pre-heater 150 is made of an inner sidewall 152, which, optionally and as illustrated, is the same structure as sidewall 138 of media vessel 110. Pre-heater 150 also includes outer sidewall 154 in a location opposed to inner sidewall 152. Pre-heater 150 also includes pre-heater outlet 158 and pre-heater inlet 162.

Pre-heater 150 includes pre-heater interior volume 160, which includes two portions: annular volume 160a and end volume 160b. Annular volume 160a is a volume having a substantially annular shape, bounded and defined by inner sidewall 152 on an inner side and outer sidewall 154 on an outer side, and extending along a portion of the length of media vessel 110. End volume 160b is a volume having a substantially flattened cylindrical shape (having a height (in the length direction of media vessel 110) that is substantially less than a diameter) that is defined and bounded by media vessel endwall 136 on one side (a top side) of end volume 160b, and by pre-heater endwall 156 on an opposed side (a bottom side) of end volume 160b.

Insulation or heating layer 170 can include a heater, an insulative (low thermal conductivity) material, or both, and is located over pre-heater 150 and vessel 110, to enclose both of pre-heater 150 and vessel 110. At the location of pre-heater 150 along a lower portion of the length of apparatus 100, at the outlet end of vessel 110, heat from a heater of heating layer 170 flows into pre-heater 150 to heat a gas flowing through the interior volume of pre-heater 150. The heat can also pass from pre-heater 150 into vessel 110 by thermal conduction through sidewall 152 (which is also sidewall 138).

In use, apparatus 100 can be used as a gas purification apparatus to treat (purify) a raw material gas that is provided for use in a manufacturing process (not shown), for example for manufacturing semiconductor or microelectronic devices. For this use, raw material gas at a relatively high level of purity can be flowed into media vessel 110 through media vessel inlet 140. The raw material gas passes through vessel 110, contacts surfaces of adsorption media 122, passes through media vessel outlet 142, then passes through end volume 160b of pre-heater 150 and exits pre-heater 150 through pre-heater outlet 158. A valve for pre-heater inlet 162 is closed during this process, and the flow of gas is not permitted to pass through inlet 162.

Pre-heater outlet 158 connects directly or indirectly to a manufacturing device, such as a semiconductor or microelectronic device manufacturing system that will receive the processed raw material gas that exits pre-heater outlet 158.

The raw material gas that exits pre-heater outlet 158 has a reduced level of impurities compared to the raw material gas that enters vessel 110 at inlet 140. As the raw material gas passes through vessel 110 and contacts media 122, impurities of the raw material gas become adsorbed and accumulated on surfaces of adsorption media 122. After an amount of the impurity as accumulated during use, media 122 becomes less useful and may be regenerated by contacting media 122 with a regeneration gas in a manner by which the regeneration gas will remove (desorb) an amount of the accumulated impurity from media 122.

In example systems a regeneration gas may flow through vessel 110 in a direction that is opposite the direction of the flow of raw material gas through vessel 110; i.e., during a purification step the raw material gas flows from top to bottom (as illustrated), from inlet 140 to outlet 142, and during a regeneration step the regeneration gas flows from bottom to top, from outlet 142 (now functioning as an inlet) to inlet 140 (now functioning as an outlet).

In a system as shown at FIG. 3, the regeneration gas can be pre-heated using pre-heater 150, and the pre-heated regeneration gas will flow from the pre-heater interior space into interior 120 of media vessel 110 through vessel outlet 142. The regeneration gas can be pre-heated by causing the regeneration gas to flow through inlet 162, through the interior volume 160 of pre-heater 150, and then through media vessel outlet 142 (acting as an inlet) and into and through the interior 120 of media vessel 110, while the heating heats the pre-heater.

When passing through inlet 162, into interior volume 160 of the pre-heater, the temperature of the regeneration gas can be any useful temperature, such as an ambient temperature (e.g., 23 degrees Celsius) or an approximately ambient temperature, e.g., a temperature in a range from 20 to 25 degrees Fahrenheit. The temperature of the pre-heater and the pre-heated gas can be any useful temperature, for example a temperature of at least 200 degrees Celsius, e.g., a temperature in a range from 210 to 350 C.

The pre-heated regeneration gas passes through media vessel 110 to contact media 122 and cause accumulated impurities present on surfaces of media 122 to be desorbed by the regeneration gas and removed from the adsorption media surfaces. The regeneration gas exits vessel 110 by flowing through vessel "inlet" 140 (which functions as an outlet), while carrying the impurity that has been desorbed from and removed from adsorption media 122.

In certain example gas purifying apparatuses, the flow rate of regeneration gas through the pre-heater and the media vessel during a regeneration step can be lower than a flow rate of raw material gas through the media vessel and pre-heater during a step of purifying the raw material gas.

A flow rate of a raw material gas through a media vessel can vary depending on the type of gas, the type of media (catalyst, adsorbent), and the type and amount of impurity to be removed, among others. In terms of "Normal cubic meters per hour" ($NM^3/hr$), examples of flow rates of raw material gas through a media vessel may be in a range from 10 to 200 $NM^3/hr$, such as from 20 to 160 $NM^3/hr$.

According to example methods of using a gas-processing apparatus as described, during a regeneration step, a flow rate of regeneration gas can be a fraction of the flow rate of a raw material gas that flows through the media vessel during a purification step. A flow rate of a regeneration gas may be, e.g., below 50, 40, 30, 20, 15, or 10 percent of the flow rate of the raw material gas through the media vessel during a purification step. The ability to perform the regeneration step using a significantly lower flow rate of regeneration gas, compared to the flow rate of the raw material gas during a purification step, may be advantageous, because the pre-heater can be built of a smaller size, e.g., volume.

Similarly, the pressure of the regeneration gas that flows through the pre-heater and can be a fraction of the pressure of the raw material gas that passes through the media vessel during a purification step. A pressure of the raw material gas within the media vessel during a purification step may be in a range from 1 to 300 pounds per square inch, gauge (psig). A pressure of a regeneration gas within pre-heater as described, during a regeneration step, may be in a range from 1 to 60 pounds per square inch, gauge (psig). Alternatively stated, the pressure (psig) of regeneration gas that flows through the pre-heater during a regeneration step may be below 50, 40, or 30 percent of the pressure (psig) of the raw material gas that flows through the media vessel during a purification step.

Table 1 shows examples of materials and operating conditions that may be used for processing various types of raw material gases (listed in the top row) in a purification step, by passing the raw material gas through an adsorbent-type gas purification system as described.

Table 1 also shows examples of materials (regeneration gases ("regen gas")) and process parameters that are useful with a gas-processing apparatus as described herein. The table describes raw material gases (top row) that undergo a purification step, example flow rates of the raw material gas during the purification step, a chemical makeup of a regeneration gas used to regenerate adsorption media, example flow rates of the regeneration gas, and example maximum temperatures during regeneration.

TABLE 1

|  | Nitrogen | Argon | Helium | Hydrogen | Ammonia | Carbon Dioxide | Clean Dry Air | Oxygen |
|---|---|---|---|---|---|---|---|---|
| Raw Material Gas Flow Rate | 60-130 $Nm^3/Hr$ | 60-130 $Nm^3/Hr$ | 60-130 $Nm^3/Hr$ | 60-130 $Nm^3/Hr$ | 40-80 $Nm^3/Hr$ | 30-75 $Nm^3/Hr$ | 65-140 $Nm3/Hr$ | 60-130 $Nm^3/Hr$ |
| Regen Gas | N2/H2 | Ar/H2 | He/H2 | H2 | N2/H2 | N2/H2 | Clean Dry Air | O2 |
| Regen | 100 slm | 100 slm | 100 slm | 100 slm | 130 slm | 100 slm | 90 slm | 85 slm |

TABLE 1-continued

|  | Nitrogen | Argon | Helium | Hydrogen | Ammonia | Carbon Dioxide | Clean Dry Air | Oxygen |
|---|---|---|---|---|---|---|---|---|
| Gas Flow Rate | N2/4 slm H2 | Ar/4 slm H2 | He/4 slm H2 | H2 | N2/55 slm H2 | N2/3 slm H2 | XCDA | O2 |
| Regen Gas Max Temp | 225° C. | 225° C. | 225° C. | 225° C. | 300° C. | 225° C. | 300° C. | 300° C. |

A gas-processing apparatus of the present description can be used with different types of media. Referring to FIG. 4, illustrated is an example of a gas-processing apparatus as described herein for use in purifying a gas by passing the gas through a bed of catalyst particles.

Gas-processing apparatus 200 includes a media vessel and a pre-heater as part of a single (combined) gas-processing apparatus. The pre-heater is combined structurally with the media vessel in a manner that provides effective pre-heating of a raw material gas that flows through the pre-heater, then the media vessel.

Apparatus 200 includes media vessel 210, which defines media vessel interior 220 (cylindrical, as illustrated), which contains media 222 in the form of a bed of catalyst particles (as illustrated). Media 222 can be particles of catalyst particles. Gas-processing apparatus 200 can be used as a gas purification apparatus to remove (e.g., chemically alter) impurities from a raw material gas by reaction of the impurity with the catalyst surface as the raw material gas is caused to flow through the bed to contact catalyst particles 222.

Media vessel 210 includes inlet 240, outlet 242, and interior volume 220 between the inlet and the outlet. More specifically, media vessel 210 includes inlet end 230 (at an upper or "top" location, as illustrated), which includes endwall 234, which contains one or more media vessel inlets (openings) 240. Media vessel 210 also includes outlet end 232 (at a lower or "bottom" location), which includes endwall 236. Media vessel interior 220 is defined by inlet endwall 234, outlet endwall 236, and sidewalls (illustrated as cylindrical) 238. Media vessel outlet end 232 can include a supportive structure such as a screen or apertured plate or disc that includes multiple openings that are sized to be smaller than the size of the particles of media 222. Media vessel outlet end 232 can thereby support particles of media 222 while allowing a flow of gas to pass between the interior of vessel 210 and outlet 242.

Apparatus 200 also includes pre-heater 250 located at the inlet end in contact with an upper portion of media vessel 210, and along at least a portion of the length of an outside of media vessel 210. The length of media vessel 210 is the distance between inlet endwall 234 and outlet endwall 236.

Pre-heater 250 is made of an inner sidewall 252, which, optionally and as illustrated, is the same structure as sidewall 238 of media vessel 210. Pre-heater 250 also includes outer sidewall 254 in a location opposed to inner sidewall 252. Pre-heater 250 also includes pre-heater inlet 262.

Pre-heater 250 includes pre-heater interior volume 260, which includes two portions: annular volume 260a and end volume 260b. Annular volume 260a is a volume having a substantially annular shape, bounded and defined by inner sidewall 252 on an inner side and outer sidewall 254 on an outer side, and extending along a portion of the length of media vessel 210. End volume 260b is a volume having a substantially flattened cylindrical shape (having a height (in the length direction of media vessel 210) that is substantially less a diameter) that is defined and bounded by media vessel endwall 234 on one side (a bottom side, as illustrated) of end volume 260b, and by pre-heater endwall 256 on an opposed side (a top side, as illustrated) of end volume 260b.

Insulation or heating layer 270 can include a heater, an insulative (low thermal conductivity) material, or both, and is located over pre-heater 250 and media vessel 210, to enclose both of pre-heater 250 and media vessel 210. At the location of pre-heater 250 along an upper portion of the length of apparatus 200, at the inlet end of vessel 210, heat from a heater of heating layer 270 flows into pre-heater 250 to heat a gas flowing through the interior volume of pre-heater 250. The heat can also pass from pre-heater 250 into vessel 210 through sidewall 252 (which is also sidewall 238).

In use, apparatus 200 can be used as a gas purification apparatus to treat (purify) a raw material gas provided as a purified raw material gas for use in a manufacturing process (not shown), for example for manufacturing semiconductor or microelectronic devices. For this use, raw material gas at a relatively high level of purity can be flowed into media vessel 210 through media vessel inlet 240, after being pre-heated using pre-heater 250. The raw material gas passes through pre-heater inlet 262, through volume 160 of pre-heater 250, through inlet 240 and into media vessel 210.

When passing through inlet 262 into interior volume 260 of the pre-heater, the temperature of the raw material gas can be any useful temperature, such as an ambient temperature (e.g., 23 degrees Celsius) or an approximately ambient temperature, e.g., a temperature in a range from 20 to 25 degree Celsius. The temperature of the pre-heater and the pre-heated gas can be any useful temperature, for example a temperature of at least 200 degrees Celsius, e.g., a temperature in a range from 210 to 350 C.

The pre-heated gas passes through the bed of catalyst particles 222, then passes through media vessel outlet 242. Outlet 242 connects directly or indirectly to a manufacturing device such as a semiconductor or microelectronic device manufacturing system that will receive the processed raw material gas that exits pre-heater outlet 242. The raw material gas that exits pre-heater outlet 242 has a reduced level of impurities compared to the raw material gas that enters pre-heater 250 at inlet 262.

In certain examples of pre-heaters as described, an interior volume that includes an annular volume and an end volume can more specifically include an annular volume defined by sidewalls that include a channel to guide a flow gas through the annular volume, to increase the efficiency of the pre-heater. One example of a useful flow channel for an annular volume is a spiral flow channel that causes flow of a gas through a spiral path that winds around a perimeter of a media vessel multiple times, while proceeding from a pre-heater inlet to an end volume of the pre-heater.

Figure 5B:
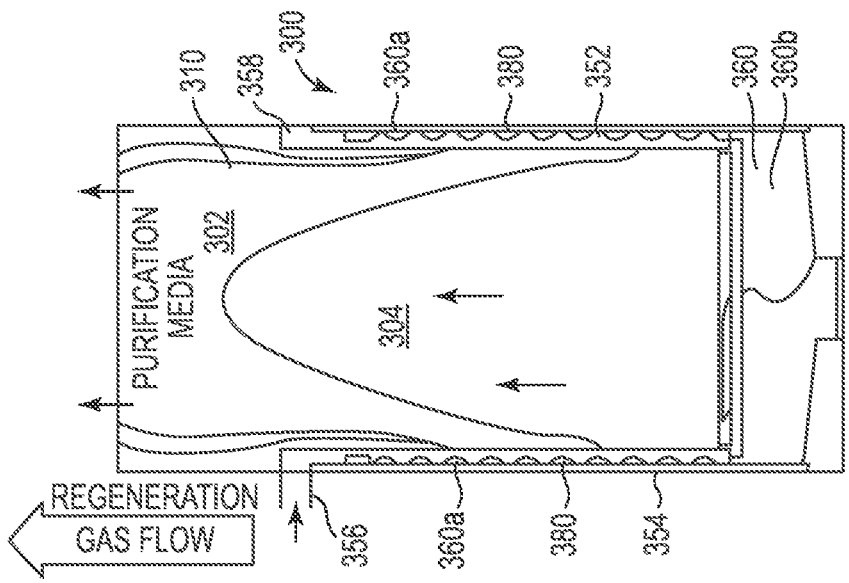
FIGS. 5A and 5B illustrate an example of a pre-heater that includes internal flow control surfaces.
Figure 5A:
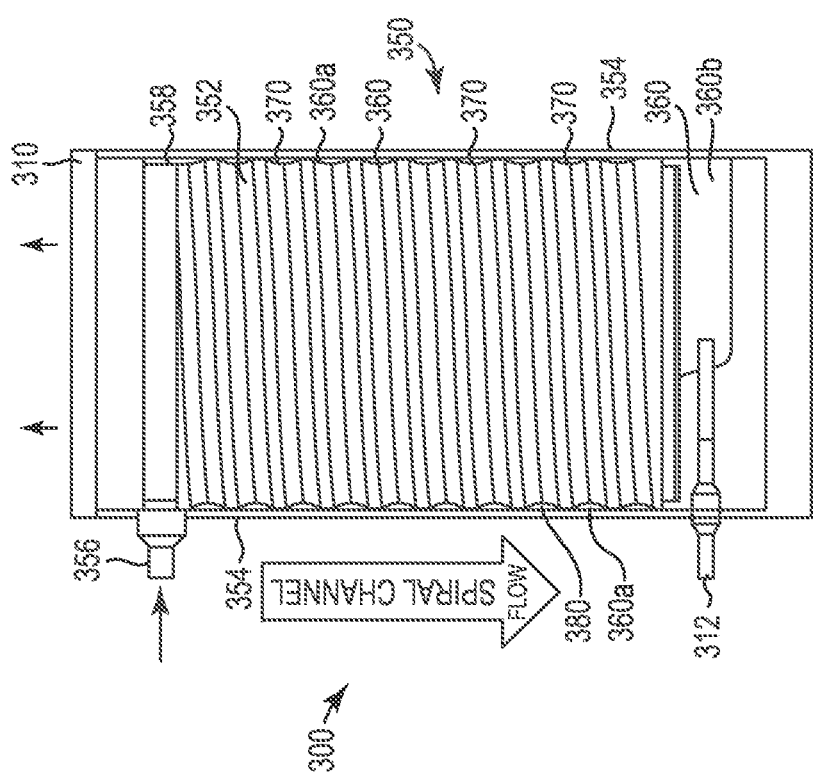

Referring to FIGS. 5A and 5B, illustrated is one example of pre-heater sidewall structures that causes a spiral flow path of a gas through an annular space of a pre-heater.

Illustrated is portion of a gas-processing apparatus 300, which includes pre-heater 350 and media vessel 310.

FIG. 5A is a cut-away view to show sidewall surfaces and an interior of the pre-heater. FIG. 5B is a cross-section view that shows an interior of the media vessel and a cross section of the pre-heater sidewalls and interior.

Pre-heater 350 includes pre-heater interior volume 360, which includes two portions: annular volume 360*a* and end volume 360*b*. Annular volume 360*a* is a volume having a substantially annular shape, bounded and defined by a grooved surface of inner sidewall 352 on an inner side and non-grooved outer sidewall 354 on an outer side. Annular volume 360*a* extends along a portion of the length of media vessel 310, which contains media 302 (shown in FIG. 5B but not 5A). Thermocouple 312 is shown at FIG. 5A.

As illustrated, grooved inner sidewall 352 includes a surface that has rounded grooves 370, which create spiral channel 380 that extends circumferentially around media vessel 310 between pre-heater inlet 356 and end volume 360*b*. At a location of inlet 356, which is at an upper (as illustrated) location of annular volume 360*a*, the annular volume includes a continuous circular-annular space 358, which extends in a non-spiral, circular path entirely around the circumference of media vessel 310 at a length-wise position of inlet 356. In a particularly preferred example of annular volume 360*a*, spiral channel 380 meets circular-annular space 358 at a location that is circumferentially opposite from inlet 356; i.e., spiral channel 380 meets circular-annular space 358 at a location that is 180 degrees from inlet 356 relative to the circumference of annular volume 360*a*.

In use, a gas (e.g., regeneration gas or raw material gas) passes into inlet 356 (see arrows, which indicate a direction of flow), enters circular-annular space 358, flows half-way (180 degrees) around the circumference of annular volume 160*a* and enters an upper (as illustrated) end of spiral channel 358. The gas flows through annular volume 160*a* in spiral path that leads to end volume 360*b*. During flow through spiral channel 358, a heater (now shown) that is in contact with outer sidewall 354 heats the gas and raises the temperature of the gas to a desired temperature. The pre-heated gas enters end volume 360*b*, then passes into interior 304 of media vessel 310, passing through a bed of media 302.

In a first aspect, gas-processing apparatus comprises: a media vessel comprising: a media vessel inlet end comprising a media vessel inlet, a media vessel outlet end comprising a media vessel outlet, a media vessel sidewall extending a length between the inlet end and the outlet end, and a media vessel interior extending between the inlet end and the outlet end; and a gas pre-heater located along a length of the media vessel sidewall.

Also disclosed is a second aspect according to the first aspect, wherein the gas pre-heater is in thermal contact with the media vessel sidewall.

Also disclosed is a third aspect according to the first or second aspects, the gas pre-heater extending around a circumference of the media vessel sidewall.

Also disclosed is a fourth aspect according to any of the preceding aspects, wherein the pre-heater extends from the outlet end along a portion of the length of the media vessel sidewall.

Also disclosed is a fifth aspect according to any of the preceding aspects, further comprising a heating element in thermal contact with at least a portion of the pre-heater, with the pre-heater disposed between the media vessel sidewall and the heating element.

Also disclosed is a sixth aspect according to any of the preceding aspects, further comprising thermal insulation that covers at least a portion of the pre-heater, with the pre-heater disposed between the media vessel and the thermal insulation.

Also disclosed is a seventh aspect according to any of the preceding aspects, further comprising an apertured endwall at the media vessel outlet, the apertured endwall separating the media vessel interior from an interior of the pre-heater.

Also disclosed is an eighth aspect according to any of the preceding aspects, wherein the pre-heater has a pre-heater interior volume that is less than 30 percent of a volume of the media vessel interior.

Also disclosed is a ninth aspect according to any of the preceding aspects, the apparatus comprising a pre-heater inlet that allows a gas to pass between an exterior location and a pre-heater interior, the pre-heater inlet being located between the media vessel inlet end and the media vessel outlet end.

Also disclosed is a tenth aspect according to the ninth aspect, further comprising: a pre-heater outlet that allows a gas to pass between an exterior location and the pre-heater interior, and an opening at the outlet end of the media vessel that allows gas to pass between the pre-heater interior and the media vessel interior.

Also disclosed is an eleventh aspect according to any of the preceding aspects, the pre-heater comprising: an inner sidewall extending along a portion of the length of the media vessel sidewall and around a perimeter of the sidewall, an outer sidewall extending along a portion of the length of the media vessel sidewall and around a perimeter of the sidewall, a pre-heater endwall spaced from the media vessel outlet, and a pre-heater interior volume comprising: an annular volume bounded by the inner sidewall and the outer sidewall, and an end volume bounded by an end of the media vessel outlet, and the pre-heater endwall.

Also disclosed is a twelfth aspect according to the eleventh aspect, wherein the annular volume comprises a spiral channel that causes gas to flow through the annular volume in a spiral-shaped path around a circumference of the annular volume.

Also disclosed is a thirteenth aspect according to any of the preceding aspects, the media vessel comprising media selected from adsorption media and catalyst.

In a fourteenth aspect, a method of using a gas-processing apparatus, where the apparatus comprises: a media vessel comprising: a media vessel inlet end comprising a media vessel inlet, a media vessel outlet end comprising a media vessel outlet, a media vessel sidewall extending a length between the inlet end and the outlet end, a media vessel interior extending between the inlet end and the outlet end, and media contained in the interior; a gas pre-heater located along a length of the media vessel sidewall; and a heating element covering at least a portion of the pre-heater, the method comprises: flowing a gas through the pre-heater to pre-heat the gas, and passing the pre-heated gas through the media vessel interior and in contact with the media.

Also disclosed is a fifteenth aspect according to the fourteenth aspect, wherein the media is adsorption media and the gas is a regeneration gas, the method comprising: flowing raw material gas through the media vessel interior and in contact with the adsorption media to allow an impurity contained in the raw material gas to be adsorbed by the adsorption media and removed from the process gas, after flowing the raw material gas through the media vessel interior: flowing a regeneration gas through the pre-heater to pre-heat the regeneration gas, and flowing the pre-heated regeneration gas through the media vessel interior and in contact with the adsorption media.

Also disclosed is a sixteenth aspect according the fifteenth aspect, the apparatus comprising: a pre-heater inlet that allows a gas to pass between an exterior location and a pre-heater interior, the pre-heater inlet being located between the media vessel inlet end and the media vessel outlet end, a pre-heater outlet that allows a gas to pass between an exterior location and the pre-heater interior, and an opening at the outlet end of the media vessel that allows gas to pass between a pre-heater interior and the media vessel interior, the method comprising: wherein: the process gas enters the media vessel interior through the media vessel inlet, and the process gas leaves the media vessel interior through the media vessel outlet, to pass into the pre-heater interior, and the process gas flows out of the pre-heater interior through the pre-heater outlet.

Also disclosed is a seventeenth aspect according the sixteenth aspect, wherein the regeneration gas enters the pre-heater interior through the pre-heater inlet, the regeneration gas leaves the pre-heater interior through the media vessel outlet, to pass into the media vessel interior, and the regeneration gas flows out of the media vessel interior through the media vessel inlet.

Also disclosed is an eighteenth aspect according to any one of the fourteenth through seventeenth aspects, further comprising flowing the raw material gas through the media vessel interior at a raw material gas flow rate, and flowing the regeneration gas through the pre-heater at a regeneration gas flow rate that is less than the raw material gas flow rate.

Also disclosed is a nineteenth aspect according to the eighteenth aspect, wherein the regeneration gas flow rate is less than 50 percent of the process gas flow rate.

Also disclosed is a twentieth aspect according to any one of the fourteenth through nineteenth aspects, further comprising flowing the raw material gas through the interior at a raw material gas pressure and flowing the regeneration gas through the pre-heater at a regeneration gas pressure that is less than the raw material gas pressure.

Also disclosed is a twenty-first aspect according to the twentieth aspect, wherein the regeneration gas pressure is less than 50 percent of the raw material gas pressure.

Also disclosed is a twenty-second aspect according to any one of the fifteenth through twenty-first aspects, wherein the raw material gas is selected from nitrogen, argon, hydrogen, ammonia, carbon dioxide, clean dry air, and oxygen.

Also disclosed is a twenty-third aspect according to the fourteenth aspect, wherein the media comprises catalyst and the gas is a raw material gas selected from nitrogen, argon, hydrogen, carbon dioxide, clean dry air, and oxygen.

Also disclosed is a twenty-fourth aspect according to the fourteenth and fifteenth aspects, wherein the impurity is a nitrogen oxide, carbon monoxide, or a hydrocarbon.

Also disclosed is a twenty-fifth aspect according to the fourteenth and fifteenth aspects, wherein the impurity is methane.

The invention claimed is:

1. A gas-processing apparatus comprising:
   a media vessel comprising:
      a media vessel inlet end comprising a media vessel inlet,
      a media vessel outlet end comprising a media vessel outlet,
      a media vessel sidewall extending a length between the inlet end and the outlet end, and
      a media vessel interior extending between the inlet end and the outlet end;
   a gas pre-heater located along a length of the media vessel sidewall,
   a gas pre-heater inlet that allows a gas to pass between an exterior location and a gas pre-heater interior, the gas pre-heater inlet being located between the media vessel inlet end and the media vessel outlet end,
   a gas pre-heater outlet that allows a gas to pass between an exterior location and the pre-heater interior, and
   an opening at the outlet end of the media vessel that allows gas to pass between the pre-heater interior and the media vessel interior.

2. The gas-processing apparatus of claim 1, wherein the gas pre-heater is in thermal contact with the media vessel sidewall.

3. The gas-processing apparatus of claim 1, the gas pre-heater extending around a circumference of the media vessel sidewall.

4. The gas-processing apparatus of claim 1, wherein the gas pre-heater extends from the outlet end along a portion of the length of the media vessel sidewall.

5. The gas-processing apparatus of claim 1, further comprising a heating element in thermal contact with at least a portion of the gas pre-heater, with the gas pre-heater disposed between the media vessel sidewall and the heating element.

6. The gas-processing apparatus of claim 1, further comprising thermal insulation that covers at least a portion of the gas pre-heater, with the gas pre-heater disposed between the media vessel and the thermal insulation.

7. The gas-processing apparatus of claim 1, further comprising an apertured endwall at the media vessel outlet, the apertured endwall separating the media vessel interior from an interior of the gas pre-heater.

8. The gas-processing apparatus of claim 1, wherein the gas pre-heater has a pre-heater interior volume that is less than 30 percent of a volume of the media vessel interior.

9. The gas-processing apparatus of claim 1, the gas pre-heater comprising:
   an inner sidewall extending along a portion of the length of the media vessel sidewall and around a perimeter of the sidewall,
   an outer sidewall extending along a portion of the length of the media vessel sidewall and around a perimeter of the sidewall,
   a pre-heater endwall spaced from the media vessel outlet, and
   a pre-heater interior volume comprising:
   an annular volume bounded by the inner sidewall and the outer sidewall, and
   an end volume bounded by an end of the media vessel outlet, and the pre-heater endwall.

10. The gas-processing apparatus of claim 9, wherein the annular volume comprises a spiral channel that causes gas to flow through the annular volume in a spiral-shaped path around a circumference of the annular volume.

11. The gas-processing apparatus of claim 9, wherein the annular volume comprises a spiral channel that causes gas to flow through the annular volume in a spiral-shaped path around a circumference of the annular volume.

12. The gas-processing apparatus of claim 1, the media vessel comprising media selected from adsorption media and catalyst.

13. A method of using a gas-processing apparatus, the apparatus comprising:
   a media vessel comprising:
      a media vessel inlet end comprising a media vessel inlet, a media vessel outlet end comprising a media vessel outlet,
a media vessel sidewall extending a length between the inlet end and the outlet end,
a media vessel interior extending between the inlet end and the outlet end, and
media contained in the interior;
a gas pre-heater located along a length of the media vessel sidewall; and
a heating element covering at least a portion of the pre-heater, the method comprising:
flowing a gas through the gas pre-heater to pre-heat the gas, and
passing the pre-heated gas through the media vessel interior and in contact with the media.

14. The method of claim 13, wherein the media is adsorption media and the gas is a regeneration gas, the method comprising:
flowing raw material gas through the media vessel interior and in contact with the adsorption media to allow an impurity contained in the raw material gas to be adsorbed by the adsorption media and removed from the process gas,
after flowing the raw material gas through the media vessel interior:
flowing a regeneration gas through the gas pre-heater to pre-heat the regeneration gas, and
flowing the pre-heated regeneration gas through the media vessel interior and in contact with the adsorption media.

15. The method of claim 14, the apparatus comprising:
a pre-heater inlet that allows a gas to pass between an exterior location and a pre-heater interior, the pre-heater inlet being located between the media vessel inlet end and the media vessel outlet end,
a pre-heater outlet that allows a gas to pass between an exterior location and the pre-heater interior, and
an opening at the outlet end of the media vessel that allows gas to pass between a pre-heater interior and the media vessel interior, the method comprising:
wherein:
the process gas enters the media vessel interior through the media vessel inlet, and
the process gas leaves the media vessel interior through the media vessel outlet, to pass into the pre-heater interior, and
the process gas flows out of the pre-heater interior through the pre-heater outlet.

16. The method of claim 15, wherein
the regeneration gas enters the pre-heater interior through the pre-heater inlet,
the regeneration gas leaves the pre-heater interior through the media vessel outlet, to pass into the media vessel interior, and
the regeneration gas flows out of the media vessel interior through the media vessel inlet.

17. The method of claim 14, further comprising flowing the raw material gas through the media vessel interior at a raw material gas flow rate and flowing the regeneration gas through the gas pre-heater at a regeneration gas flow rate that is less than the raw material gas flow rate.

18. The method of claim 14, further comprising flowing the raw material gas through the interior at a raw material gas pressure and flowing the regeneration gas through the gas pre-heater at a regeneration gas pressure that is less than the raw material gas pressure.

19. The method of claim 14, wherein the raw material gas is selected from nitrogen, argon, hydrogen, ammonia, carbon dioxide, clean dry air, and oxygen.

20. A gas-processing apparatus comprising:
a media vessel comprising:
a media vessel inlet end comprising a media vessel inlet,
a media vessel outlet end comprising a media vessel outlet,
a media vessel sidewall extending a length between the inlet end and the outlet end, and
a media vessel interior extending between the inlet end and the outlet end; and
a gas pre-heater located along a length of the media vessel sidewall, the gas pre-heater comprising:
an inner sidewall extending along a portion of the length of the media vessel sidewall and around a perimeter of the sidewall,
an outer sidewall extending along a portion of the length of the media vessel sidewall and around a perimeter of the sidewall,
a pre-heater endwall spaced from the media vessel outlet, and
a pre-heater interior volume comprising:
an annular volume bounded by the inner sidewall and the outer sidewall, and
an end volume bounded by an end of the media vessel outlet, and the pre-heater endwall.

21. A gas-processing apparatus comprising:
a media vessel comprising:
a media vessel inlet end comprising a media vessel inlet,
a media vessel outlet end comprising a media vessel outlet,
a media vessel sidewall extending a length between the inlet end and the outlet end, and
a media vessel interior extending between the inlet end and the outlet end;
a gas pre-heater located along a length of the media vessel sidewall; and
an apertured endwall at the media vessel outlet, the apertured endwall separating the media vessel interior from an interior of the gas pre-heater.

* * * * *